US005986256A

United States Patent [19]
Yagi

[11] Patent Number: 5,986,256
[45] Date of Patent: Nov. 16, 1999

[54] SCANNING PROBE MICROSCOPE USING FLUORESCENT LIGHT

[75] Inventor: Akira Yagi, Sagamihara, Japan

[73] Assignee: Olympus Optical Co., Ltd., Tokyo, Japan

[21] Appl. No.: 09/038,605

[22] Filed: Mar. 11, 1998

[30] Foreign Application Priority Data

Mar. 17, 1997 [JP] Japan ................................. 9-062880

[51] Int. Cl.$^6$ ............................. H01J 3/14; G01N 23/00; F21V 9/16
[52] U.S. Cl. ...................... 250/234; 250/306; 250/459.1
[58] Field of Search ................................. 250/234, 306, 250/458.1, 459.1, 309

[56] References Cited

U.S. PATENT DOCUMENTS

| | | | |
|---|---|---|---|
| 4,700,225 | 10/1987 | Hara et al. | 250/458.1 |
| 4,963,752 | 10/1990 | Landis et al. | 250/459.1 |
| 5,091,652 | 2/1992 | Mathies et al. | 250/458.1 |
| 5,479,024 | 12/1995 | Hillner et al. | 250/459.1 |
| 5,581,082 | 12/1996 | Hansma et al. | 250/306 |

*Primary Examiner*—Stephone Allen
*Attorney, Agent, or Firm*—Frishauf, Holtz, Goodman, Langer & Chick, P.C.

[57] ABSTRACT

Disclosed is a scanning probe microscope using fluorescent light, comprising a lever section including a probe, an actuator for moving the probe and a sample relative to each other, a light source unit arranged at a position suitable for permitting at least one of the probe and the sample to be irradiated with light having a first wavelength or a second wavelength, which is emitted from the light source unit, and a detecting unit arranged at a position suitable for optically detecting the positional relationship between the probe and the sample, wherein a first fluorescent material, which emits light having the second wavelength when excited with light of the first wavelength, is imparted to one of the probe and the sample, a second fluorescent material, which emits light having a third wavelength when excited with light having the second wavelength, is imparted to the other of the probe and the sample, and the detecting unit optically detects the positional relationship between the probe and the sample based on the light having the third wavelength.

45 Claims, 5 Drawing Sheets

SCANNING PROBE MICROSCOPE USING FLUORESCENT LIGHT

BACKGROUND OF THE INVENTION

The present invention relates to a scanning probe microscope using fluorescent light capable of measuring various data by utilizing a fluorescence phenomenon while recognizing the positional relationship between a probe and a sample.

In the conventional scanning probe microscope using fluorescent light of this type, the probe is coated with a fluorescent material emitting a fluorescent light when excited by a light of a predetermined wavelength. On the other hand, the sample set in a microscope stage is also coated with a fluorescent material emitting a fluorescent light when excited by a light of a predetermined wavelength.

If the sample and the probe are irradiated with light having the predetermined wavelength in starting the data measurement, a fluorescent light is emitted from each of the probe and the sample.

Where the probe is positioned as desired relative to the sample position in performing the actual measurement, the microscope stage is moved while monitoring the positional relationship between the fluorescent light images of the probe and the sample by, for example, a CCD camera. When overlapping has taken place between these two fluorescent light images, the probe is regarded as being positioned as desired relative to the sample. Under this condition, various data of the sample are measured.

When it comes to a scanning probe microscope using fluorescent light in which the sample is scanned with a resolution of about sub-micron to sub-nanometer order, the positional relationship between the probe tip and the sample is required to be recognized with a high precision.

In the conventional scanning probe microscope using fluorescent light, it is certainly possible to position the probe somewhat close to a desired position relative to the sample position. However, it is difficult to recognize the positional relationship between the probe tip and the sample with a high precision. To be more specific, the fluorescent light emitted from each of the probe and the sample is diffused around the probe tip and the sample, with the result that the probe tip and the sample are buried in the fluorescent light images. It follows that, even if each of these fluorescent light images is monitored by a CCD camera, it is very difficult to recognize based on the fluorescent light images the positional relationship between the probe tip and the sample with a high precision.

As pointed out above, the conventional scanning probe microscope using fluorescent light is defective in that it is difficult to determine accurately how much the probe tip is deviated in the lateral direction (that is, XY direction) from the sample. It is also difficult to determine accurately the distance that is, the distance in Z direction between the probe tip and the sample, even where the probe tip is positioned right above the sample.

What should also be noted is that, where a substance other than the sample emits a fluorescent light of a color equal to that of the fluorescent light emitted from the sample, by self-excitation, it is difficult to determine whether the fluorescent light image, which is being observed, is formed by the fluorescent light emitted from the sample or said other substance. In this case, it is possible for the probe to be positioned erroneously relative to said other substance.

BRIEF SUMMARY OF THE INVENTION

An object of the present invention, which has been achieved in an attempt to overcome the above-noted problems inherent in the prior art, is to provide a scanning probe microscope using fluorescent light capable of recognizing the positional relationship between the probe tip and the sample with a high precision.

According to an aspect of the present invention, there is provided a scanning probe microscope using fluorescent light, comprising a lever section including a probe;

an actuator for moving the probe and a sample relative to each other;

a light source unit arranged at a position suitable for permitting at least one of the probe and the sample to be irradiated with light having a first wavelength or a second wavelength, which is emitted from the light source unit; and a detection unit arranged at a position suitable for optically detecting the positional relationship between the probe and the sample, wherein:

a first fluorescent material, which emits light having the second wavelength when excited with light of the first wavelength, is imparted to one of the probe and the sample;

a second fluorescent material, which emits light having a third wavelength when excited with light having the second wavelength, is imparted to the other of the probe and the sample; and the detecting unit optically detects the positional relationship between the probe and the sample based on the light having the third wavelength.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

FIGS. 1 and 2A to 2F are collectively directed to a scanning probe microscope using fluorescent light according to the first embodiment of the present invention. As shown in the drawings, the scanning probe microscope using fluorescent light of this embodiment comprises a cantilever 10 provided with a probe 22, an actuator for moving the probe 22 and a sample relative to each other, a light source unit arranged at a position suitable for permitting at least one of the probe and the sample to be irradiated with light having a first wavelength, which is emitted from said light source unit, and a detecting unit arranged at a position suitable for optically detecting the positional relationship between the probe and the sample.

Figure 1:
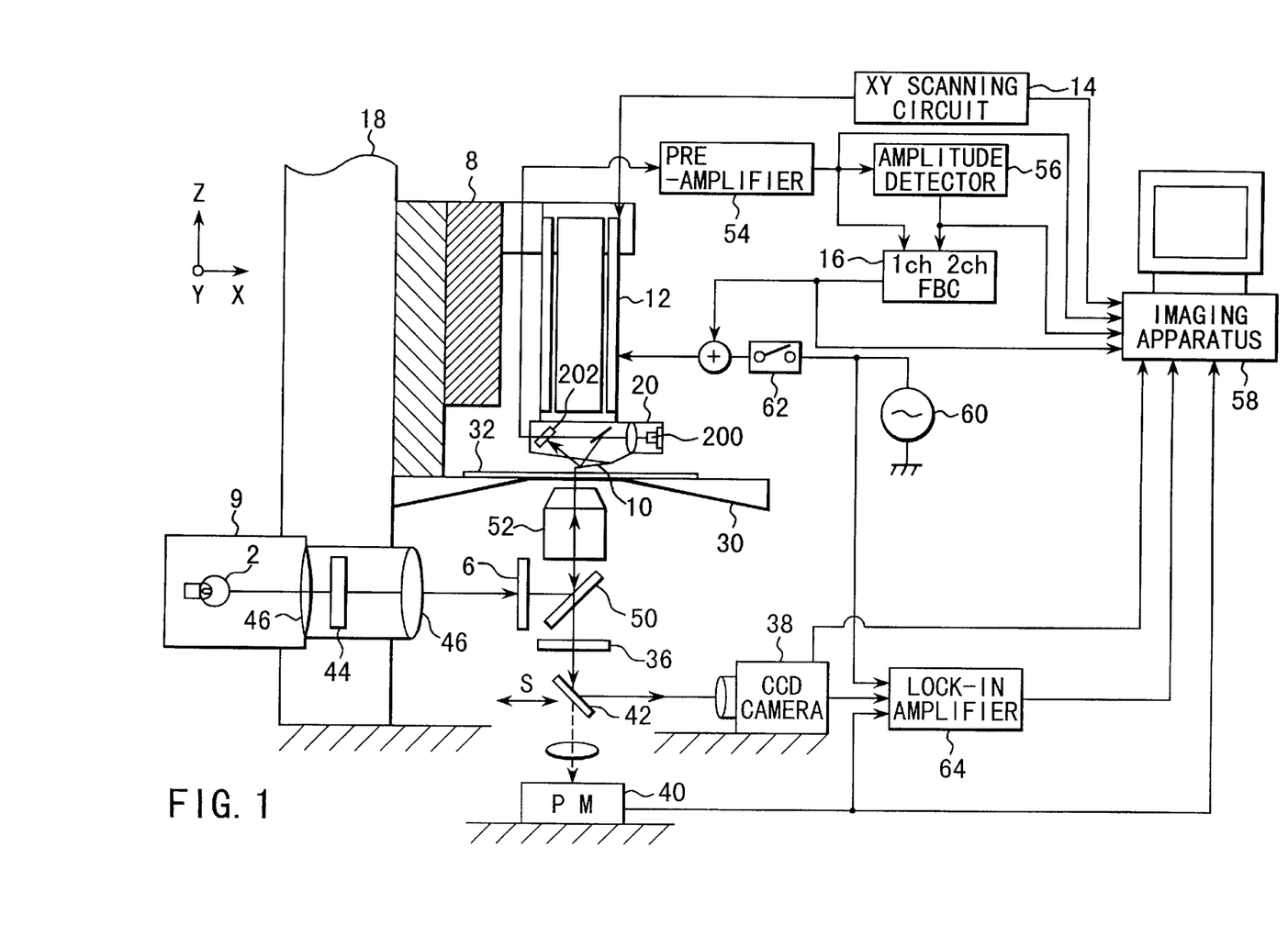
FIG. 1 shows the construction of a scanning probe microscope using fluorescent light according to a first embodiment of the present invention.

In the first embodiment, a fluorescent material which emits light having a second wavelength component upon excitation with light having a first wavelength component is imparted to the probe 22. On the other hand, a fluorescent material which emits light having a third wavelength component upon excitation with light having the second wavelength component is imparted to the sample. It should be noted that the detecting unit optically detects the positional relationship between the probe 22 and the sample based on the light having the third wavelength component.

The light source unit includes a lamp house 4 having a light source 2 arranged therein and a filter 6 of an excited light. It is possible to use, for example, a mercury lamp or a xenon lamp as the light source 2. It should be noted that, among the light emitted from the lamp house 4, only the light component having a first wavelength can be transmitted through the filter 6. Incidentally, light having an optional color can be used as the light component having the first wavelength, though a violet light is used as the light component having the first wavelength in this embodiment. Also, the filter 6 for the excited light can be switched to a filter capable of selectively transmitting the light having the second wavelength. The switching can be performed by incorporating a plurality of filters capable of selectively transmitting light having a desired wavelength in, for example, a slide type or rotary turret such that a desired filter is positioned on the optical axis of the light emitted from the light source 2.

The actuator includes a cylindrical tube scanner 12 having a stationary section fixed to a Z-stage 8 and also having the cantilever 10 mounted to the movable section thereof, an XY scanning circuit 14 which produces an XY scanning signal serving to displace the movable section of the cylindrical tube scanner 12 in an XY direction, and a feed back circuit 16 (hereinafter referred to as "FBC") which produces a control signal serving to displace the movable section of the cylindrical tube scanner 12 in a Z-direction. It should be noted that the Z-stage 8 is mounted to a body 18 of the scanning type fluorescent light probe microscope such that the Z-stage 8 is movable in a Z-direction relative to the body 18. In other words, the cylindrical tube scanner 12 can be moved in a Z-direction by driving the Z-stage 8.

Figure 2A:
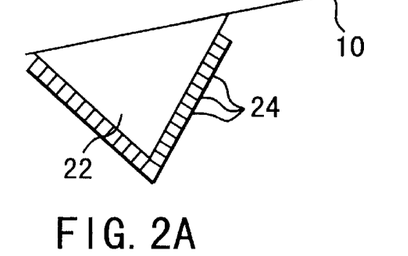
FIG. 2A shows the probe tip having a fluorescent material imparted thereto by means of an LB membrane forming method.
Figure 2B:
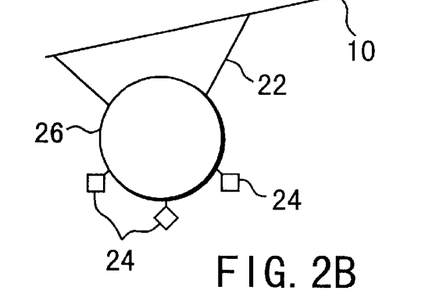
FIG. 2B shows the construction of the probe tip having a latex ball attached thereto, a fluorescent material being contained in said latex ball.

A displacement sensor 20 of an optical lever type is mounted to the movable section of the cylindrical tube scanner 12. The proximal end portion of the cantilever 10 is supported by the displacement sensor 20. On the other hand, the probe 22 is mounted to the distal end portion of the cantilever 10, as shown in FIGS. 2A and 2B.

A fluorescent material which emits light having the second wavelength upon excitation with light having the first wavelength is imparted to the tip of the probe 22. For example, a blue fluorescent protein (BFP) 24, which emits a blue light upon excitation with light having a wavelength falling within a region of between an ultraviolet region and a blue light region, e.g., a purple light, is imparted to the tip of the probe 22. For imparting the fluorescent material to the tip of the probe 22, it is desirable to form a membrane of a fluorescent material on the tip of the probe 22 by means of an LB membrane forming method, as shown in FIG. 2A. It is also desirable to attach a latex ball 26 having the fluorescent material 24 mounted thereto to the tip of the probe 22, as shown in FIG. 2B.

The samples used in this embodiment of the present invention include, for example, a living sample which has been sliced thin and a cultured cell cultured in a predetermined liquid culture medium. In the following description, a cell membrane 34 of a cultured cell 28 is used as a sample. Particularly, attentions are paid in this embodiment to a protein 29 exhibiting a specified function on the cell membrane 34. Specifically, a fluorescent stain (modification) is performed by gene manipulation of the protein 29 so as to achieve observation (measurement).

In the following description, the cell membrane 34 of the cultured cell 28 is simply termed cell membrane 34, and the protein on the cell membrane 34 is simply termed protein.

Figure 2C:
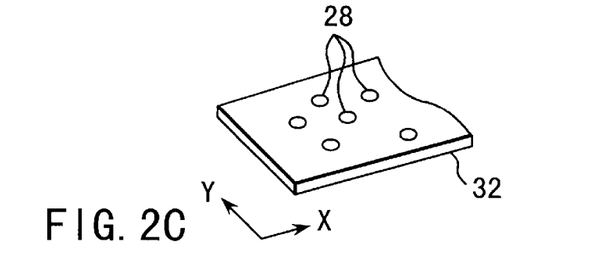
FIG. 2C is an oblique view showing that cultured cells are dotted on a slide glass.

FIG. 2C shows that cultured cells 28 are dotted on a slide glass 32 disposed within a measuring region of a microscope stage 30. It is also possible to take the cell membrane 34 out of the cultured cell 28 so as to put the cell membrane 34 alone on the slide glass 32, as shown in FIG. 2D.

Figure 2D:
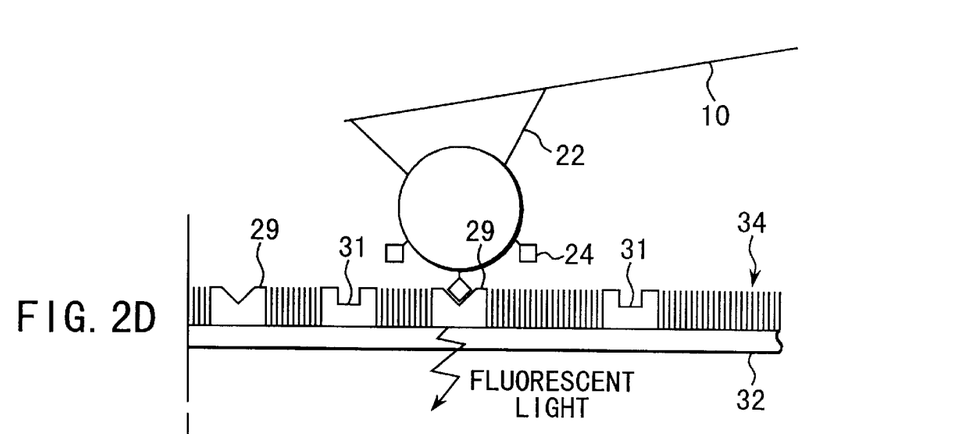
FIG. 2D shows that, when the probe tip gains access to the membrane of the cultured cell, a fluorescent light is emitted from the fluorescent material imparted to the protein on the cell membrane.

FIG. 2D shows the construction of the cell membrane 34 used as a sample in this embodiment of the present invention. A protein 29 subjected to a fluorescent stain and another protein 31 not subjected to a fluorescent stain are schematically shown within a lipid double-layer structure constituting the cell membrane 34. In this case, the fluorescent stain is achieved by the gene manipulation noted above.

Let us describe the staining of the protein more in detail. Specifically, a green fluorescent protein (GFP) which emits light of a third wavelength, e.g., green light in this embodiment, upon excitation with light of a second wavelength, e.g., blue light, is imparted to the desired protein 29. Incidentally, the fluorescent material GFP is not particularly shown in the drawing. However, FIG. 2D shows that the protein 29 having the fluorescent material GFP imparted thereto is denoted by a triangular recess formed in a surface region. On the other hand, the protein 31 not having the fluorescent material GFP imparted thereto is denoted by a rectangular recess formed in a surface region.

As described previously, the detecting unit includes an absorbing filter 36, a CCD camera 38, a photomultiplier tube 40 and a movable mirror 42. When the measuring region is irradiated with light having the first wavelength (purple light), which is emitted from the light source unit, light having the second wavelength (blue light) is emitted from the probe 22 having the fluorescent material (BFP) imparted thereto. Under this condition, light having the third wavelength (green light), which is emitted from the protein 29 having the fluorescent material (GFP), which is excited by the blue light, imparted thereto, can be selectively transmitted through the absorbing filter 36. The green light which has passed through the absorbing filter 36 can be detected by the CCD camera 38 and the photomultiplier tube 40. Further, the green light passing through the absorbing filter 36 is guided by the movable mirror 42 into any one of the CCD camera 38 and the photomultiplier 40.

In the detecting unit of the particular construction, the green light emitted from the protein 29 having the fluorescent material (GFP) imparted thereto is guided by the movable mirror 42 into the CCD camera 38. On the other hand, where the green light emitted from the protein 29 having the fluorescent material (GFP) imparted thereto is so weak as not to be detected by the CCD camera 38, the movable mirror 42 is slid in a direction denoted by an arrow S, with the result that the green light is guided into the photomultiplier 40.

Let us describe the operation of the apparatus according to the first embodiment of the present invention with reference to FIGS. 1 and 2A to 2F. In describing the operation, let us suppose that the sample, i.e., the cultured cell 28 or the cell membrane 34 is set on the slide glass 32 mounted on the microscope stage 30 as shown in FIG. 2C together with a culture medium (not shown). Let us also suppose that the latex ball 26 having the fluorescent material (BFP) mounted thereon is attached to the probe 22.

In the first step, the cylindrical tube scanner 12 is moved by driving the Z-stage 8 so as to bring the tip of the probe 22 into a region close to the slide glass 32. Then, the light source 2 within the lamp house 4 is turned on, and a shutter 44 is opened. As a result, the light emitted from the light source 2 runs through a collector lens 46 and a condenser lens 48 so as to reach the filter 6 for the excited light. Further, the light of the first wavelength (purple light), which has passed through the filter 6, is reflected by a dichroic mirror 50. Further, the reflected light is guided by an objective lens 52 so as to permit the slide glass 32 to be irradiated with the reflected light.

Under this condition, the movable section of the cylindrical tube scanner 12 is displaced in an XY direction based on an XY scanning signal generated from the XY scanning circuit 14 so as to permit the probe 22 to be scanned along the surface of the slide glass 32.

Incidentally, it is possible to employ a dynamic mode measuring method in which the cantilever 10 is vibrated under a predetermined resonance frequency during the scanning operation of the probe 22. Alternatively, it is also possible to employ a static mode measuring method in which the cantilever 10 is not vibrated during the scanning of the probe 22.

It should also be noted that, in this embodiment, the probe 22 is allowed to be scanned along the surface of the slide glass 32 by using the cylindrical tube scanner 12. However, since it suffices to have the probe 22 and the sample on the slide glass 32 moved relative to each other, it is also possible to mount a scanning mechanism on the side of the microscope stage 30.

In this step, the cantilever 10 is displaced (bent) by the interactive force such as an atomic force or an adsorption force acting between the tip of the probe 22 and the surface of the cell membrane 34, and the displacement is optically detected by a displacement sensor 20.

Mounted to the displacement sensor 20 are a semiconductor laser 200 and a photo diode 202. The semiconductor laser 200 permits condensing the light on a back surface on which the probe 22 is not formed. On then other hand, the photo diode 202 receives the light reflected from the cantilever 10 so as to generate an electric signal denoting the amount of the received light. If the cantilever 10 is displaced, the spot position of the reflected light, which is condensed on the photo diode 202, is changed. As a result, the electric signal generated from the photo diode 202 is also changed to conform with the change in the spot position.

As described above, the electric signal generated from the photo diode 202 is changed to conform with the state of displacement of the cantilever 10, with the result that the displacement sensor 20 utilizes the electric signal generated from the photo diode 202 as a displacement signal denoting the state of displacement of the cantilever 10. Further, the displacement signal generated from the displacement sensor 202 is supplied to a first input terminal 1ch to an FBC 16 through a pre-amplifier 54.

The FBC 16 supplies a control signal to the cylindrical tube scanner 12 based on the detecting signal supplied to the first input terminal 1ch so as to permit the displacement of the cantilever 10 to be maintained at a predetermined value and, thus, to displace the movable section of the cylindrical tube scanner 12 to be displaced in a Z-direction. As a result, the force of interaction between the tip of the probe 22 and the surface of the cell membrane 34 is maintained constant.

Figure 2E:
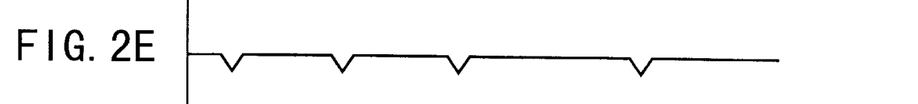
FIG. 2E shows the output state of a feed back circuit.
Figure 2F:
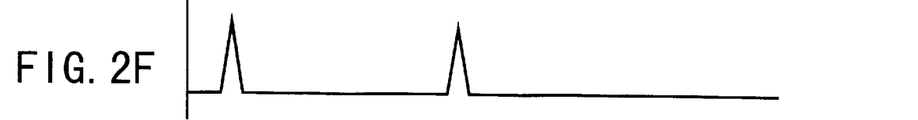
FIG. 2F shows the output state of a CCD camera or a photomultiplier tube.

While the feed back control is being performed as described above, the surface information and the position information of the cell membrane 34 disposed on the slide glass 32 are displayed on an imaging apparatus 58 based on the control signal generated from the FBC 16, as shown in FIG. 2E. To be more specific, a projection-recess information on the sample is displayed mainly on the imaging apparatus 58.

While the probe 22 is being scanned in an XY direction along the slide glass 32 by the feed back control, the light of the second wavelength (blue light) is emitted from the fluorescent material (BFP) imparted to the latex ball 26 at the tip of the probe 22 upon excitation with the light of the first wavelength (purple light) emitted from the objective lens 52. Further, when the slide glass 32 is irradiated with the light of the first wavelength (purple light) emitted from the objective lens 52, light having various wavelengths is emitted from the slide glass 32, the cell membrane 34 and other substances contained in the liquid culture medium, as shown in FIG. 2D. To be more specific, since the fluorescent material (BFP) imparted to the tip of the probe 22 emits light having the second wavelength upon excitation with light having the first wavelength, which is emitted from an illuminating unit, the tip of the probe 22 functions as a provisional light source for exciting the protein particle 29 having the fluorescent material (GFP) imparted thereto.

In this case, if the latex ball 26 gains access to the protein 29 having the fluorescent material (GFP) imparted thereto, the fluorescent material (GFP) of the protein 29 is excited by the blue light emitted from the fluorescent material (BFP) attached to the latex ball 26 so as to emit a green light.

The green light emitted from the protein 29 is taken into the objective lens 52 together with other light and, then, transmitted to the absorption filter 36 through the dichroic mirror 50. The absorption filter 36 performs the function of selectively transmitting the green light alone. The green light transmitted through the absorption filter 36 is caused to strike the CCD camera 38 by the movable mirror 42. In this step, the state of the green light emission and the light emitting position are displayed together with the surface information and the position information of the cell membrane 34 on the imaging apparatus 58 based on the signal supplied from the CCD camera 38 to the imaging apparatus 58, as shown in FIGS. 2D and 2E.

It should be noted that the brightness (light amount) of the green light displayed on the imaging apparatus 58 is inversely proportional to the distance between the latex ball 26, hereinafter referred to as the "tip of the probe", and the protein 29. To be more specific, the light amount of the green light is diminished with increase in the distance between the tip of the probe and the protein 29, by contraries, the light amount of the green light is increased with decrease in the distance between the tip of the probe and the protein 29 (the energy transfer phenomenon). It follows that the positional relationship between the tip of the probe and the surface of the protein 29 (cell membrane 34) can be detected with a high precision by detecting the change in the brightness (light amount) of the green light. To be more specific, it is possible to know how much the tip of the probe 22 is deviated in the lateral direction (that is, XY direction) from the protein 29 (cell membrane 34). It is also possible to know accurately the distance that is, the distance in Z direction between the tip of the probe 22 and the protein 29 (cell membrane 34) in the case where the tip of the probe 22 is positioned right above the protein 29 (cell membrane 34).

It should be noted that, where the green light emitted from the protein 29 (cell membrane 34) is too weak to be detected by the CCD camera 38, it suffices to slide the movable mirror 42 in a direction denoted by an arrow S so as to permit the green light to be transmitted to the photomultiplier 40. As a result, the weak green light is amplified by the photomultiplier 40, and the amplified signal is supplied to the imaging apparatus 58.

The fluorescent material (GFP) imparted to the protein 29 does not emit a green light until the tip of the probe 22 gains access to the protein 29 to a predetermined distance. Therefore, even where other substances emit a green light by self-excitation, it is possible to recognize that the tip of the probe 22 has been positioned accurately as desired relative to the protein 29, i.e., a sample to be measured, by monitoring the green light which is emitted only when the tip of the probe 22 is positioned close to the protein 29. Further, the technical idea of the present invention permits eliminating the defect inherent in the prior art that the tip of the probe 22 is erroneously positioned on the basis of a substance other than the sample to be measured.

It should also be noted that all the protein particles 29 having the fluorescent material (GFP) imparted thereto and dotted on the slide glass 32 are collectively allowed to emit a green light by switching the filter 36 for the excited light to permit the slide glass 32 to be irradiated with a blue light. Also, the positions of all the protein particles 29 present within the measuring region can be collectively recognized by monitoring these green light beams. It should be noted that, where a new green light has been monitored in a scanning point where a green light was not emitted during the XY scanning, it is possible to confirm formation of a substance layer which inhibits a green light emission in a plane of the particular scanning point on that side of the protein 29 which faces the probe.

As described above, the first embodiment of the present invention provides a scanning probe microscope using fluorescent light capable of recognizing with a high precision the positional relationship between the tip of the probe 22 and the protein 29 (cell membrane 34).

In the first embodiment described above, the measuring region is continuously irradiated with light having a third wavelength (purple light). However, in order to prevent the fluorescent material from being faded, it is also possible to arrange, for example, a photo chopper in place of the shutter 44 so as to irradiate the measuring region with a purple light at a desired timing.

It should be noted, however, that, where the sample is adversely affected optically by the purple light or an ultraviolet light, it is possible to employ a fluorescent light exciting method of a two photon absorption type in which the measuring region is irradiated with a pulse-shaped light having a double wavelength.

It should also be noted that, while the probe 22 is being scanned in an XY direction, it is possible for force to be applied to the sample under culturing, i.e., the cultured cell 28 or the cell membrane 34, leading to displacement: of the sample. In this case, it is desirable to employ a dynamic mode measuring method in which the probe 22 is vibrated in a Z-direction within a predetermined amplitude of vibration in order to lessen the burden imposed on the sample and to prevent the sample from being displaced without doing a damage to the sample.

To achieve the dynamic mode measuring method, a function generator 60 serving to generate an excitation modulation signal in a Z-direction is connected to the cylindrical tube scanner 12 with a switch 62 interposed therebetween in the scanning probe microscope using fluorescent light of the present invention, as shown in FIG. 1. If the switch 62 is turned on, the excitation modulation signal generated from the function generator 60 is added to the control signal generated from the FBC 16 and, then, supplied to the cylindrical tube scanner 12. In this step, the movable section of the cylindrical tube scanner 12 is vibrated at a predetermined amplitude based on the excitation modulation signal. As a result, the probe 22 formed at the tip of the cantilever 10 is vibrated in a Z-direction at a predetermined amplitude.

Under this condition, the vibration amplitude of the cantilever 10 is optically detected by the photo diode 202 of the displacement sensor 20, and the detecting signal is supplied to an amplitude detector 56 through a pre-amplifier 54. The excited state of the cantilever 10 is detected in the amplitude detector 56 and, then, the excited detection signal is supplied to a second input terminal 2ch of the FBC 16.

Even where the interactive force such as an atomic force acting between the cell membrane 34 and the probe 22 is changed, the FBC 16 permits the movable section of the cylindrical tube scanner 12 to be displaced in a Z-direction by applying a feed back control to the cylindrical tube scanner 12 so as to maintain constant the excitation detection signal (excited state of the cantilever 10) supplied to the second input terminal 2ch of the FBC 16. As a result, the probe 22 is scanned in an XY direction while being vibrated at a predetermined amplitude. In this step, the surface information and position information of the cell membrane 34 are displayed on the imaging apparatus 58 based on the output of the amplitude detector 56 or the FBC 16.

During the feed back control operation which is performed with the probe 22 kept vibrated, the light amount of the green light detected by the CCD camera 38 or the photomultiplier tube 40 is changed in accordance with vibration of the probe 22. As a result, the signal generated from the CCD camera 38 or the photomultiplier 40 is also changed at a predetermined frequency. It follows that the light emitting state of the protein particle 29, which emits light in synchronism with amplitude of vibration of the probe 22, can be displayed on the imaging apparatus 58 by supplying these signals to the lock-in-amplifier 64 in synchronism with the excited modulation signal of the function generator 60. For example, the lock-in-amplifier 64 permits an image based on the signals generated from the photomultiplier 40 or the CCD camera 38 to be displayed on the imaging apparatus 58 in a location where the probe 22 is positioned closest to the sample.

The particular construction described above makes it possible to provide a scanning probe microscope using fluorescent light capable of recognizing with a high precision the positional relationship between the tip of the probe 22 and the cultured cell 28 or the cell membrane 34 without doing a damage to the sample and without changing the position of the cultured cell 28 or the cell membrane 34. Further, according to the particular construction, the imaging treatment is performed within the imaging apparatus 58 on the basis of the excitation modulation signal generated from the function generator 60, leading to an improved separation state between the optical noise signal and the measuring signal.

In the construction described above, the cylindrical tube scanner 12 is controlled on the basis of the excitation modulation signal generated from the function generator 60 so as to vibrate the probe 22. However, the present invention is not limited to this particular construction. For example, it is possible to arrange an actuator (not shown) for exciting the cantilever separately from the cylindrical tube scanner 12. In this case, the probe 22 is vibrated by supplying the excitation modulation signal generated from the function generator 69 to the actuator for exciting the cantilever.

Figure 3:
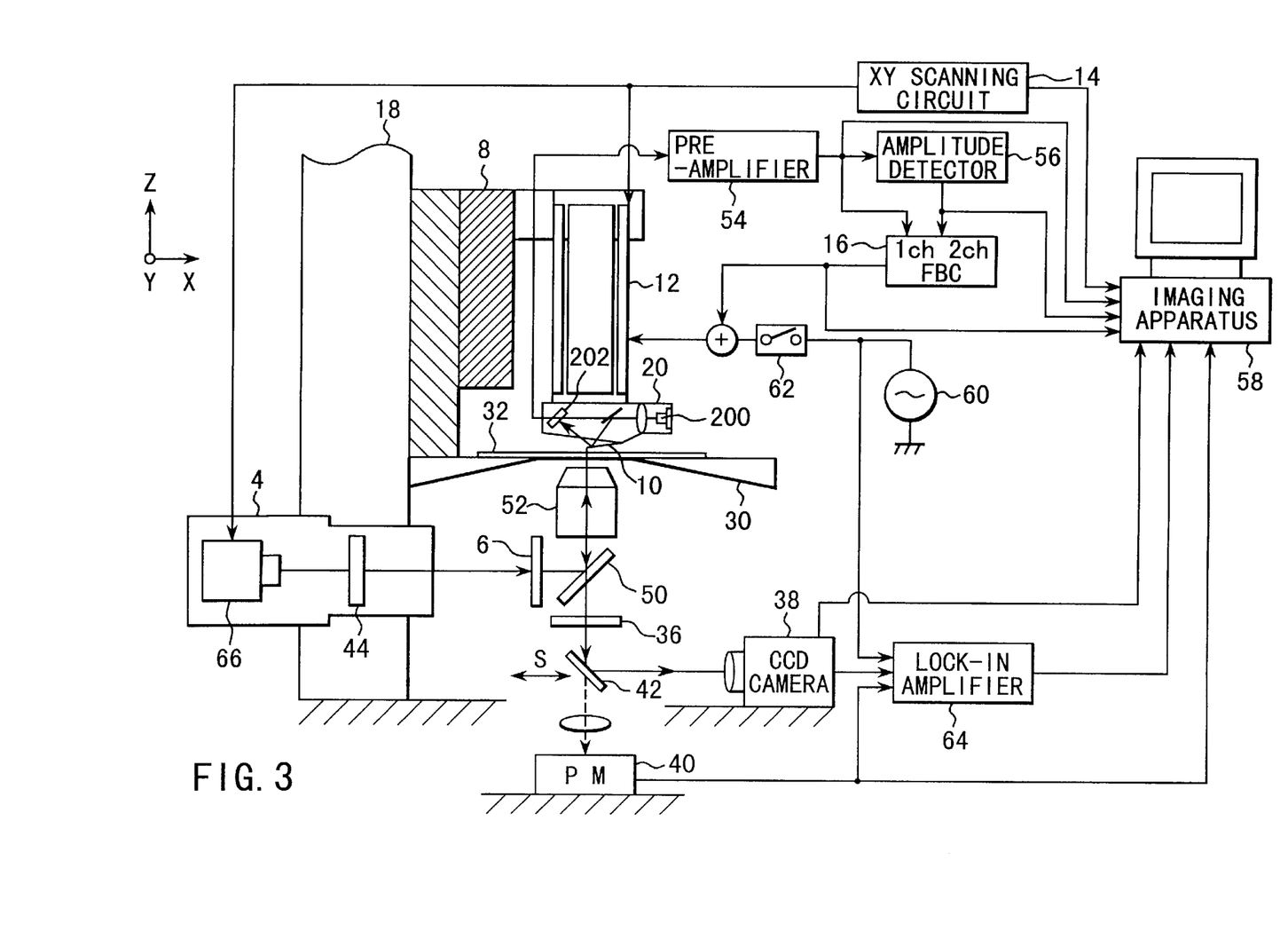
FIG. 3 shows the construction of a scanning probe microscope using fluorescent light according to a second embodiment of the present invention.

FIG. 3 shows a scanning probe microscope using fluorescent light according to a second embodiment of the present invention. It should be noted that the members of the microscope common with the first and second embodiments are denoted by the same reference numerals so as to omit description of these members in the following description of the second embodiment.

As shown in FIG. 3, the light source unit included in the second embodiment comprises an irradiation element capable of selectively irradiating the probe 22 alone (see FIGS. 2A and 2B) with light having the first wavelength (purple light) during the scanning operation of the probe 22. The irradiating element is housed in the lamp house 4 and includes a laser light emitter 66 capable of selectively irradiating the probe 22 alone with a laser light.

As in the first embodiment, the cultured cell 28, or the cell membrane 34, set on the slide glass 32 (see FIG. 2C) is used as a sample in the second embodiment, too. Also, a fluorescent material (BFP), which emits light having the second wavelength (blue light) upon excitation with light having the first wavelength (green light), is imparted to the tip (latex ball 26) of the probe 22 by the fluorescent light treating method similar to that employed in the first embodiment (see FIGS. 2A and 2B). To be more specific, since the fluorescent material (BFP) imparted to the tip of the probe 22 emits light having the second wavelength upon excitation with light having the first wavelength, which is emitted from an illuminating unit, the tip of the probe 22 functions as a provisional light source for exciting the protein particle 29 having the fluorescent material (GFP) imparted thereto. The second embodiment is equal to the first embodiment in the other construction and, thus, the description of the other construction is omitted.

The operation of the second embodiment is substantially equal to that of the first embodiment. Therefore, let us describe that portion of the operation of the second embodiment which differs from the operation of the first embodiment.

When the probe 22 included in the microscope of the second embodiment is scanned in an XY direction along the membrane cell 34 disposed on the slide glass 32, the laser light emitter 66 is operated based on the XY scanning signal generated from the XY scanning circuit 14. If the shutter 44 is opened in this step, the laser light emitted from the laser light emitter 66 is selectively transmitted through the filter 6 for the excited light. Specifically, the laser light having a first wavelength alone, i.e., a purple laser light, is transmitted through the filter 6 and, then, through the dichroic mirror 50 and the objective lens 52 so as to irradiate the -tip alone of the probe 22.

When the probe 22 is scanned in an XY direction, the emitting direction of the laser light from the laser light emitter 66 is controlled based on the XY scanning signal generated from the XY scanning circuit 14. As a result, since the irradiating position of the purple laser light is changed to follow the scanning movement of the probe 22, the tip of the probe 22 is kept irradiated with the purple laser light.

If the tip of the probe 22 approaches the protein 29 having a fluorescent material (GFP) imparted thereto during the scanning movement of the probe 22, the fluorescent material (GFP) attached to the protein 29 is excited by the blue light emitted from the fluorescent material (BFP) attached to the tip of the probe 22 so as to emit a green light. It follows that it is possible to recognize with a high precision the positional relationship between the tip of the probe 22 and the protein 29 (cell membrane 34) by detecting the emitting state and emitting position of the green light with the CCD camera 38 or the photomultiplier tube 40, as in the first embodiment. Further, in the second embodiment, the operation is controlled to permit a very small portion of the measuring region to be irradiated with a purple laser light, making it possible to prevent more effectively the fluorescent material from being faded. Still further, it is desirable to arrange a photo chopper in place of the shutter 4 so as to permit the measuring region to be irradiated with the laser light at a predetermined timing, as in the first embodiment. The other functions and effects produced by the second embodiment are similar to those produced by the first embodiment and, thus, the description thereof is omitted.

FIGS. 4A to 4E and 5 collectively show a scanning probe microscope using fluorescent light according to a third embodiment of the present invention. It should be noted that the members of the microscope common with the first and third embodiments are denoted by the same reference numerals so as to omit description of these members in the following description of the third embodiment.

Each of the first and second embodiments described above is directed to the recognition of the positional relationship between the tip of the probe 22 and the protein particles 29 dotted on the surface of the cell membrane 34 and having a fluorescent material (GFP) imparted thereto. However, it is also necessary to recognize not only the positional relationship on the surface but also the positional relationship in the depth direction.

The third embodiment is intended to provide a scanning probe microscope using fluorescent light capable of recognizing simultaneously the positional relationship between the tip of the probe 22 and the sample, e.g., protein, on the surface and in the depth direction.

Figure 4A:
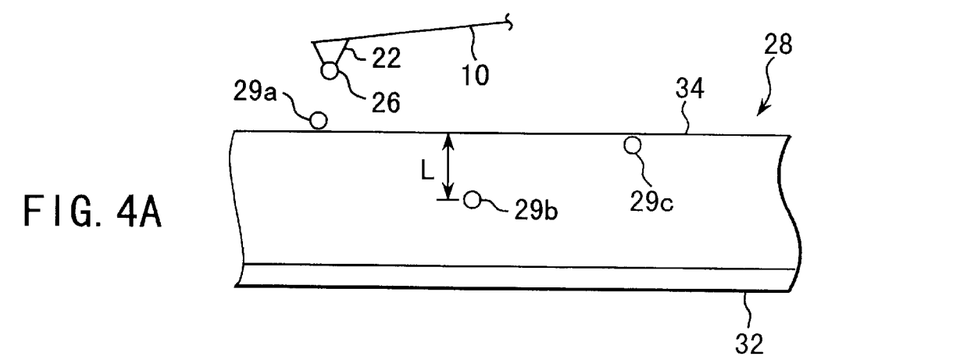
FIG. 4A shows the position of a sample set in a scanning probe microscope using fluorescent light according to a third embodiment of the present invention.

The cultured cell 28 used as a sample in the third embodiment includes not only the protein particle 29a present on the front surface of the cell membrane 34 but also the protein particles 29b, 29c present deep inside the cell membrane 34 and behind the front surface of the cell membrane 34, respectively, as shown in FIG. 4A.

Figure 4B:
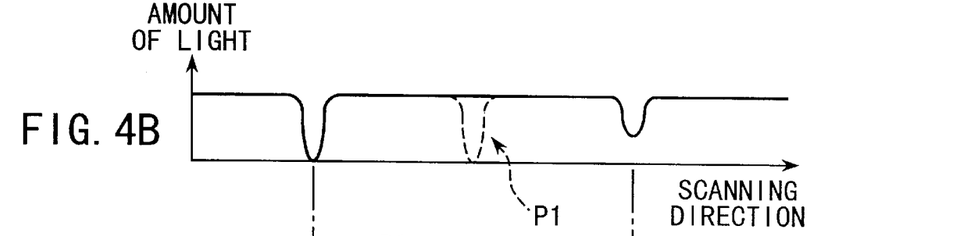
FIG. 4B shows that the amount of light emitted from the probe tip is decreased by the energy transfer phenomenon of light.
Figure 4C:
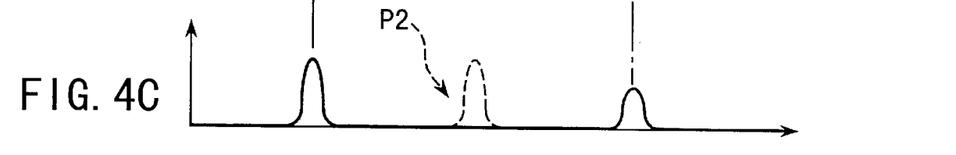
FIG. 4C shows how light is caused to be emitted from the sample by the energy transfer phenomenon of light.

As described previously in conjunction with the first embodiment, the tip of the probe 22 is scanned in an XY direction relative to the cultured cell 28 while allowing the tip of the probe 22 having the fluorescent material (BFP) attached thereto to emit light of the second wavelength (blue light). As a result, the amount of the blue light emitted from the tip of the probe 22 is decreased because of the energy transfer phenomenon, as shown in FIG. 4B. On the other hand, light having a third wavelength (green light) is not emitted from the protein 29b, though the green light is emitted from each of the protein particles 29a and 29c, as shown in FIG. 4C.

It should be noted that the protein particle 29b is positioned a distance L apart from the cell membrane 34, as shown in FIG. 4A, with the result that the fluorescent material (GFP) of the protein particle 29b is not excited by the blue light emitted from the tip of the probe 22. Since a green light is not emitted from the protein particle 29b, it is impossible in this case to recognize the presence of the protein particle 29b. Incidentally, the protein particle 29c is present behind the front surface of the cell membrane 34. In this case, the presence of the cell membrane 34 causes the amount of green light emitted from the protein particle 29c to be decreased to some extent.

Under the condition described above, the filter 6 for the excited light is switched to permit the slide glass 32 to be irradiated with the blue light. As a result, a green light is emitted simultaneously from all the protein particles 29a, 29b and 29c so as to permit the presence of the protein particle 29b to be recognized.

In order to measure the depth of location of the protein particle 29b, i.e., the distance L between the cell membrane 34 and the protein particle 29b, it is necessary to detect simultaneously the optical change based on the energy transfer phenomenon of light, i.e., the change in the blue light emitted from the latex ball 26 at the tip of the probe 22, and the change in the green light emitted from the protein particle 29b.

Figure 5:
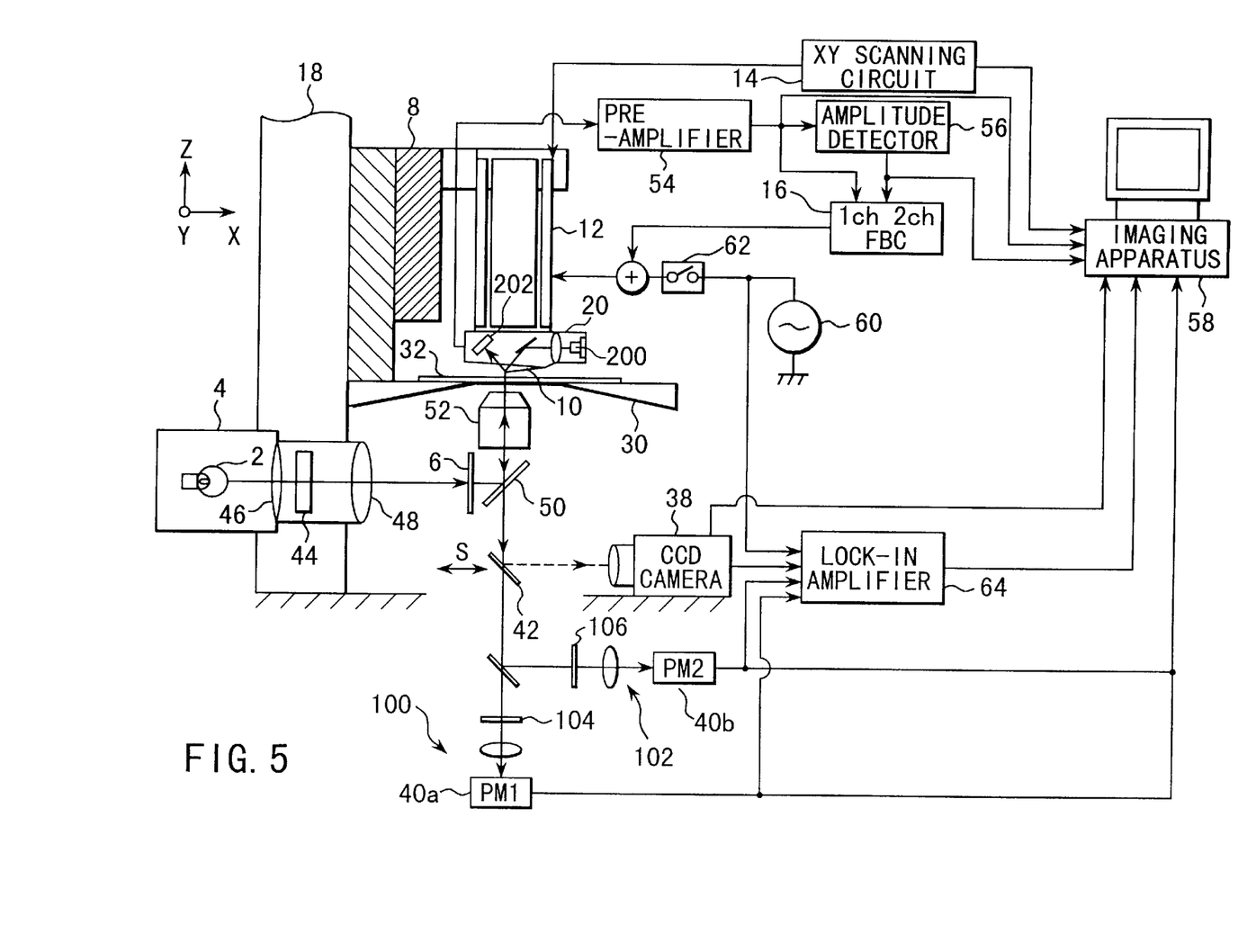
FIG. 5 shows the construction of a scanning probe microscope using fluorescent light according to a third embodiment of the present invention.

In order to meet the above-noted requirement, used in this embodiment is a scanning probe microscope using fluorescent light according to a third embodiment of the present invention, which is constructed as shown in FIG. 5. To be more specific, the scanning probe microscope using fluorescent light shown in FIG. 5 comprises a first detecting system 100 capable of detecting light having the second wavelength (blue light) and a second detecting system 102 capable of detecting light having the third wavelength (green light).

Included in the first detecting system 100 are a first absorption filter 104 which permits transmitting the blue light alone and a first photomultiplier 40a serving to amplify the blue light transmitted through the first absorption filter 104. Likewise, included in the second detecting system 102 are a second absorption filter 106 which permits transmitting the green light alone and a second photomultiplier 40b serving to amplify the green light transmitted through the second absorption filter 106. The third embodiment shown in FIG. 5 is basically equal to the first embodiment shown in FIG. 1 in respect of the other construction of the apparatus and, thus, the description of the other construction is omitted herein.

Let us describe how to measure the depth of location of the protein particle 29b. Let us suppose in the following description that the presence of the protein particle 29b is recognized before or after the scanning of the probe 22 in an XY direction.

In the pre-treatment process, the tip of the probe 22 is scanned in an XY direction along the cell membrane 34 so as to measure the state of change between the blue light emitted from the tip of the probe 22 and the green light emitted from the protein particles 29a, 29b, 29c. In this case, the state of change is measured on the basis of the energy transfer phenomenon of light.

It should be noted that the blue light emitted from the latex ball 26 at the tip of the probe 22 runs into the objective lens 52 and, then, is guided to the first detecting system 100 through the dichroic mirror 50 and a half mirror 108. Then, the blue light is transmitted through the first absorption filter 104 so as to be supplied to the imaging apparatus 58 through the first photomultiplier 40a and the lock-in-amplifier 64. The scanning of the tip of the probe 22 in the XY direction is continued while allowing the imaging apparatus 58 to monitor the change in the amount of the blue light (see FIG. 4B).

If the latex ball 26 at the tip of the probe 22 approaches the protein particle 29a or 29c, the amount of the blue light emitted from the tip of the probe 22 is decreased based on the energy transfer phenomenon of light. On the other hand, the protein particle 29a or 29c is caused to emit a green light, and the amount of the emitted green light is gradually increased, as shown in FIG. 4C. The green light emitted from the protein particle 29a or 29c runs into the objective lens 52 and, then, is guided into the second detecting system 102 through the dichroic mirror 50 and the half mirror 108. Further, the green light is transmitted through the second absorption filter 106 so as to be supplied to the imaging apparatus 58 through the second photomultiplier 40b and the lock-in-amplifier 64.

Under the state described above, the changes in the amounts of the blue light and the green light are simultaneously displayed on the imaging apparatus 58 such that these changes can be compared with each other, as shown in FIGS. 4B and 4C.

When the blue light has completely disappeared to cause the green light alone to be displayed on the imaging apparatus 58, it is determined that the tip of the probe 22 has been brought into contact with the protein particle 29a or 29c. The data of the determination, e.g., data on the optical change, is stored as a reference value in, for example, the imaging apparatus 58. Then, the tip of the probe 22 is positioned right above the protein particle 29b so as to measure the depth of location of the protein particle 29b. In this embodiment, it is desirable to use a static mode measuring method in which the cantilever 10 is not vibrated.

In the next step, the tip of the probe 22 is gradually moved to approach the protein particle 29b. When the tip of the probe 22 has been brought into contact with the cell membrane 34, the amount of the bending of the cantilever 10 caused by the interactive action between the tip of the probe 22 and the cell membrane 34 is optically detected by a displacement sensor 20. The detected data, which is hereinafter referred to as a "first detection data", is stored in, for example, the imaging apparatus 58.

The tip of the probe 22 is further moved so as to be pushed into the cell membrane 34 and, thus, to approach the protein particle 29b. In accordance with movement into the cell membrane 34, the amount of blue light emitted from the tip of the probe 22 is decreased based on the energy transfer phenomenon. On the other hand, the protein particle 29b begins to emit a green light, and the amount of the emitted green light is gradually increased. In this case, the changes in the amounts of the blue light and the green light are simultaneously displayed in that region of the imaging apparatus 58 in which no change was observed previously, as denoted by dotted lines P1 and P2 shown in FIGS. 4B and 4C. These changes in the amounts of the blue light and the green light are simultaneously displayed in a manner to be compared with each other.

The tip of the probe 22 is further pushed toward the protein particle 29b while monitoring the changes in the light amount. When the blue light has completely disappeared so as to cause the green light alone to be displayed on the imaging apparatus 58, it is determined based on the reference value referred to previously that the tip of the probe 22 has been brought into contact with the protein particle 29b. It should be noted that, when the tip of the probe 22 has been brought into contact with the protein particle 29b, the cantilever 10 is bent so as to reflect the pushing amount of the probe 22. The bending amount of the cantilever 10 is optically detected by the displacement sensor 20, and the detection data (hereinafter referred to as a "second detection data") is stored in, for example, the imaging apparatus 58.

A predetermined arithmetic operation is applied to the first and second detection data within the imaging apparatus 58 so as to calculate the distance L between the cell membrane 34 and the protein particle 29b and, thus, to measure the depth of location of the protein particle 29b.

As described above, the scanning probe microscope using fluorescent light according to the third embodiment permits simultaneously detecting the positional relationships between the probe and the protein particle on the front surface of the cell membrane and between the probe and the protein particle present inside the cell membrane.

In the third embodiment described above, the presence of the protein particle 29b is recognized before or after the scanning of the probe in the XY direction. However, the recognition is not limited to this case. For example, the presence of the protein particle 29b can also be recognized during the scanning operation of the probe in the XY direction. In this case, a fluorescent material (BFP), which emits light having the second wavelength (blue light) upon excitation with light having the first wavelength (purple light), is imparted to each of the protein particles 29a, 29b, 29c. At the same time, a fluorescent material (GFP), which emits light having the third wavelength (green light) upon excitation with light of the second wavelength (blue light), is imparted to the latex ball 26 at the tip of the probe 22.

In the particular construction described above, the light having the first wavelength (purple light), which is emitted from the light source 2 and transmitted through the filter 6 for the excited light, is reflected by the dichroic mirror 50 and, then, the reflected light is transmitted through the objective lens 52 so as to have the cultured cell 28 on the slide glass 32 irradiated with the reflected light. In this case, the light having the second wavelength (blue light) is emitted simultaneously from the protein particles 29a, 29b, 29c dotted within the cultured cell 28.

Figure 4D:
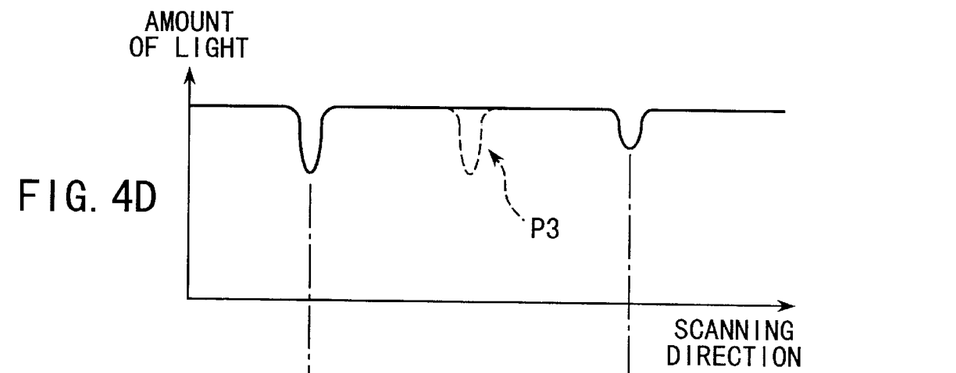
FIG. 4D shows how the amount of light emitted from the sample is caused to be decreased by the energy transfer phenomenon of light in a modification of the third embodiment of the present invention.

It should be noted that blue light beams emitted from the protein particles 29a, 29b, 29c are collectively incident on the objective lens 52 and, then, supplied to the imaging apparatus 58 through the dichroic mirror 50, the half mirror 108, the first absorption filter 104, the first photomultiplier 40a and the lock-in-amplifier 64. Under this condition, the probe is kept scanned in the XY direction while allowing the imaging apparatus 58 to monitor the changes in the amounts of all the blue light beams, as shown in FIG. 4D.

Figure 4E:
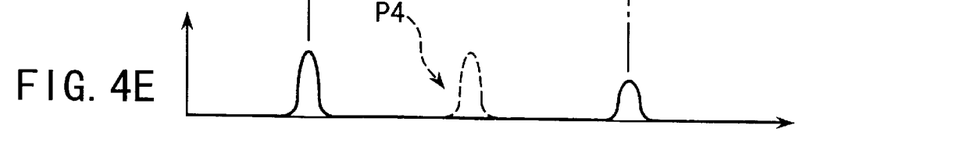
FIG. 4E shows how light is caused to be emitted from the probe tip by the energy transfer phenomenon of light in a modification of the third embodiment of the present invention.

If the latex ball 26 at the tip of the probe 22 approaches the protein particle 29a or 29c, the amount of the blue light emitted from the protein particle 29a or 29c is decreased on the basis of the energy transfer phenomenon. On the other hand, the light having the third wavelength (green light) begins to be emitted from the latex ball 26 at the tip of the probe 22, and the amount of the emitted green light is gradually increased, as shown in FIG. 4E.

In this case, the green light emitted from the latex ball 26 at the tip of the probe 22 is incident on the objective lens 52 and, then, supplied to the imaging apparatus 58 through the dichroic mirror 50, the half mirror 108, the second absorption filter 106, the second photomultiplier 40b and the lock-in-amplifier 64. Under this condition, the changes in the amounts of the blue light and green light are displayed on the imaging apparatus in a manner to be compared with each other, as shown in FIGS. 4D and 4E. When the blue light has completely disappeared to cause the green light alone to be displayed on the imaging apparatus, it is determined that the tip of the probe 22 has been brought into contact with the protein particle 29a or 29c. The data on the determination, e.g., data on the optical change, is stored as a reference value in, for example, the imaging apparatus 58.

Incidentally, it is possible to recognize the blue light emission from the protein particle 29b upon excitation with light having the first wavelength. However, since the protein particle 29b is positioned deep inside the cell membrane 34, an energy transfer phenomenon of light does not take place. Therefore, a green light is riot emitted from the latex ball 26 at the tip of the probe 22 (see the dotted line P4 shown in FIG. 4E).

In the next step, the tip of the probe 22 is positioned right above the protein particle 29b for measuring the depth of location of the protein particle 29b. For measuring the depth, it is desirable to employ a static mode measuring method in which the cantilever 10 is not vibrated.

In measuring the depth of location of the protein particle 29b, the tip of the probe 22 positioned right above the protein particle 29b is moved toward the protein particle 29b. When the tip of the probe 22 has been brought into contact with the cell membrane 34, the amount of bending of the cantilever 10 caused by the interactive action between the tip of the probe 22 and the cell membrane 34 is optically detected by the displacement, sensor 20. The detection data (hereinafter referred to as a "first detection data") is stored in, for example, the imaging apparatus 58.

Then, the tip of the probe 22 is pushed into the cell membrane 34. In accordance with movement of the probe 22 toward the protein particle 29b, the amount of the blue light emitted from the protein particle 29b is decreased on the basis of the energy transfer phenomenon. On the other hand, a green light begins to be emitted from the tip of the probe 22, and the amount of the green light emitted from the tip of the probe 22 is gradually increased. In this step, the changes in the amounts of the blue light and the green light are simultaneously displayed in that region of the imaging apparatus 58 in which no change was recognized previously, as denoted by dotted lines P3 and P4 in FIGS. 4D and 4E. These changes in the amounts of the blue light and the green light are displayed in a manner to be compared with each other.

Then, the tip of the probe 22 is further pushed toward the protein particle 29b while monitoring the changes in the amounts of the blue light and the green light. When the blue light has completely disappeared to cause the green light alone to be displayed, it is determined on the basis of the reference value referred to previously that the tip of the probe has been brought into contact with the protein particle 29b.

When the tip of the probe 22 has been brought into contact with the protein particle 29b, the cantilever 10 is bent in an amount corresponding to the pushing amount of the probe 22. In this step, the bending amount of the cantilever 10 is optically detected by the displacement sensor 20, and the detection data (hereinafter referred to as a "second detection data") is stored in, for example, the imaging apparatus 58.

A predetermined arithmetic operation is applied to the first and second detection data within the imaging apparatus so as to calculate the distance L between the cell membrane 34 and the protein particle 29b. As a result, the depth of location of the protein particle 29b is measured.

As described above, the modification described above permits providing a scanning probe microscope using fluorescent light capable of recognizing simultaneously the positional relationships between the probe and the protein particle present on the surface of the cell membrane and between the probe and the protein particle present inside the cell membrane.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A scanning probe microscope using fluorescent light, comprising:
   a lever section including a probe;
   an actuator for moving said probe and a sample relative to each other;
   a light source unit arranged at a position suitable for permitting at least one of the probe and the sample to be irradiated with light having a first wavelength or a second wavelength, which is emitted from said light source unit; and
   a detecting unit arranged at a position suitable for optically detecting the positional relationship between the probe and the sample,
   wherein:
   a first fluorescent material, which emits light having the second wavelength when excited with light of said first wavelength, is imparted to one of the probe and the sample;
   a second fluorescent material, which emits light having a third wavelength when excited with light having said second wavelength, is imparted to the other of the probe and the sample; and
   said detecting unit optically detects the positional relationship between the probe and the sample based on the light having said third wavelength.

2. The scanning probe microscope according to claim 1, wherein said first fluorescent material consists of BFP, and said second fluorescent material consists of GFP.

3. The scanning probe microscope according to claim 1, wherein said first fluorescent material consists of GFP and said second fluorescent material consists of BFP.

4. The scanning probe microscope according to claim 1, wherein said light source unit includes a filter for the excited light, which selectively transmits the light having the first wavelength, and another filter for the excited light, which selectively transmits the light having the second wavelength, any one of these filters being arranged on the optical path of the light emitted from the light source unit.

5. The scanning probe microscope according to claim 1, wherein said light source unit includes a photo chopper for transmitting the light emitted from the light source at a predetermined timing.

6. The scanning probe microscope according to claim 1, wherein said sample is irradiated with light having the second wavelength, which is emitted from said light source unit.

7. The scanning probe microscope according to claim 1, wherein said probe and said sample are positioned deviant from each other in a lateral direction.

8. The scanning probe microscope according to claim 1, wherein said probe and said sample are positioned deviant from each other in a Z-direction.

9. The scanning probe microscope according to claim 1, wherein said probe is irradiated with light of the first wavelength emitted from said light source unit.

10. The scanning probe microscope according to claim 9, wherein said probe is scanned in an XY direction by said actuator, and the light of the first wavelength is controlled to follow the scanning direction of the probe.

11. The scanning probe microscope according to claim 1, further comprising:
   an XY scanning circuit for supplying to said actuator a signal for allowing said probe and said sample to be scanned relative to each other;
   another detecting unit for detecting the amount of change in the interactive force between the probe and the sample so as to generate an electric signal denoting the amount of change in said force; and
   a feedback control unit for generating a control signal based on the output signal of said another detecting unit for driving the actuator so as to control the distance between the probe and the sample.

12. The scanning probe microscope according to claim 11, wherein said another detecting unit includes another light source unit for irradiating said lever section with light emitted therefrom, and a photo-detector for detecting the light reflected from the lever section, the displacement of the lever section based on the change in the interactive force between said probe and said sample being detected by said photo-detector, and an electric signal denoting said displacement being supplied to said feedback control unit.

13. The scanning probe microscope according to claim 12, wherein said interactive force between the probe and the sample is an atomic force or a contact force acting between the probe and the sample.

14. The scanning probe microscope according to claim 1, wherein said first fluorescent material is imparted to said probe to cause the probe to emit light having the second wavelength, and said second fluorescent material is imparted to said sample to cause the sample to emit light having the third wavelength upon excitation with light having the second wavelength.

15. The scanning probe microscope according to claim 14, wherein said detecting unit includes a light detecting element for detecting light having the third wavelength, and an optical filter arranged on an optical path between said light detecting element and the sample and selectively transmitting only the light having the third wavelength.

16. The scanning probe microscope according to claim 15, wherein said detecting unit includes a camera capable of observing said sample and said probe, and a display apparatus for displaying an image based on an electric signal supplied from the camera or based on the light having the third wavelength generated from said light-detecting element.

17. The scanning probe microscope according to claim 16, wherein said detecting unit includes a movable mirror arranged on an optical path between said filter and said light detecting element for transmitting the light of the third wavelength to one of the light detecting element and said camera.

18. The scanning probe microscope according to claim 15, wherein the positional relationship between said probe and said sample is determined on the basis of change in the amount of light of the third wavelength emitted from the sample, said light emission being derived from the energy transfer phenomenon of light.

19. The scanning probe microscope according to claim 16, wherein said light source unit includes a filter for the excited light, which selectively transmits the light having the first wavelength, and another filter for the excited light, which selectively transmits the light having the second wavelength, any one of these filters being arranged on the optical path of the light emitted from the light source unit.

20. The scanning probe microscope according to claim 19, wherein said image display apparatus recognizes the light having the third wavelength, which is emitted from said sample, as information denoting the position of the sample to which is imparted the second fluorescent material, under the condition that the filter for the excited light, which selectively transmits the light having the second wavelength, is arranged on the optical path of the light emitted from the light source unit.

21. The scanning probe microscope according to claim 14, wherein said detecting unit includes:
a light detecting element detecting the light of the second wavelength;
an optical filter arranged between said light detecting element and said sample, said filter selectively transmitting only the light of the second wavelength;
another light detecting element for detecting the light of the third wavelength; and
another optical filter arranged between said another light detecting element and the sample, said another filter selectively transmitting only the light of the third wavelength.

22. The scanning probe microscope according to claim 21, wherein said detecting unit includes a camera capable of observing said sample and said probe, and an image display apparatus for displaying an image based on an output signal of said camera or an image based on the light components of the second wavelength and third wavelength generated from each of said light detecting elements.

23. The scanning probe microscope according to claim 22, wherein said detecting unit includes a movable mirror arranged on an optical path and positioned closer to said sample than said filter and said another filter for transmitting each of the light components having the second wavelength and third wavelength to one of the light detecting element and said camera.

24. The scanning probe microscope according to claim 12, the positional relationship between said probe and said sample is determined on the basis of change in the amounts of the light components having the second wavelength and third wavelength, said change being derived from the energy transfer phenomenon of light.

25. The scanning probe microscope according to claim 22, wherein said light source unit includes a filter for the excited light, which selectively transmits the light having the first wavelength, and another filter for the excited light, which selectively transmits the light having the second wavelength, any one of these filters being arranged on the optical path of the light emitted from the light source unit.

26. The scanning probe microscope according to claim 25, wherein said image display apparatus recognizes the light having the third wavelength, which is emitted from said sample, as information denoting the position of the sample to which is imparted the second fluorescent material, under the condition that the filter for the excited light, which selectively transmits the light having the second wavelength, is arranged on the optical path of the light emitted from the light source unit.

27. The scanning probe microscope according to claim 14, wherein said detecting unit includes a camera capable of observing said sample and said probe, and an image display apparatus for displaying an image based on the output signal from said camera.

28. The scanning probe microscope according to claim 14, wherein said first fluorescent material is imparted to said probe by an LB film forming method or imparted to a latex ball attached to the tip of the probe, and said second fluorescent material is what is used for staining the sample by gene manipulation.

29. The scanning probe microscope according to claim 1, wherein said first fluorescent material is imparted to said probe to allow the probe to emit light having the second wavelength, said second fluorescent material is imparted to said sample to allow the sample to emit light having the third wavelength, and said detecting unit includes a light detecting element for detecting the light having the third wavelength.

30. The scanning probe microscope according to claim 29, further comprising:
an XY scanning circuit for supplying to said actuator a signal for allowing said probe and said sample to be scanned relative to each other;
another detecting unit for detecting the amount of change in the interactive force between the probe and the sample so as to generate an electric signal denoting the amount of change in said force; and
a feedback control unit for generating a control signal based on the output signal of said another detecting unit for driving the actuator so as to control the distance between the probe and the sample, the light having the third wavelength being detected by said light detecting element while the distance between the probe and the sample is being controlled by said feedback control unit.

31. The scanning probe microscope according to claim 30, wherein said feedback control unit to serving to drive said actuator, to permit maintaining constant the distance between said probe and said sample.

32. The scanning probe microscope according to claim 30, wherein said feedback control unit drives said actuator to move said probe toward said sample so as to be pushed into the sample, the pushing amount of the probe into the sample being detected by said another detecting unit and supplied to said feedback control unit.

33. The scanning probe microscope according to claim 30, further comprising exciting means for vibrating said probe, and said feedback control unit to serving to drive said actuator, to control the distance between the probe and the sample to maintain constant the amplitude of the vibrating probe.

34. The scanning probe microscope according to claim 33, wherein said exciting means consists of a function generator supplying an excitation modulation signal to said actuator.

35. The scanning probe microscope according to claim 33, further comprising take-in means for taking in the light having the third wavelength which is emitted in synchronism with vibration of the probe.

36. The scanning probe microscope according to claim 35, wherein said take-in means consists of a lock-in-amplifier.

37. The scanning probe microscope according to claim 1, wherein said first fluorescent material is imparted to said sample to cause the sample to emit light having the second wavelength, and said second fluorescent material is imparted to said probe to cause the probe to emit light having the third wavelength upon excitation with light having the second wavelength.

38. The scanning probe microscope according to claim 37, wherein said detecting unit includes a camera capable of observing said sample and said probe and an image display apparatus for displaying an image based on the output signal of said camera.

39. The scanning probe microscope according to claim 37, wherein said first fluorescent material is imparted to said probe by an LB film forming method or imparted to a latex ball attached to the tip of the probe, and said second fluorescent material is what is used for staining the sample by gene manipulation.

40. The scanning probe microscope according to claim 37, further comprising:
    an XY scanning circuit for supplying to said actuator a signal for allowing said probe and said sample to be scanned relative to each other;
    another detecting unit for detecting the amount of change in the interactive force between the probe and the sample so as to generate an electric signal denoting the amount of change in said force; and
    a feedback control unit for generating a control signal based on the output signal of said another detecting unit for driving the actuator so as to control the distance between the probe and the sample,
    wherein said feedback control unit drives said actuator to move said probe toward said sample so as to be pushed into the sample, the pushing amount of the probe into the sample being detected by said another detecting unit and supplied to said feedback control unit.

41. The scanning probe microscope according to claim 37, wherein said detecting unit includes:
    a light detecting element for detecting light of the second wavelength;
    an optical filter arranged between said light detecting element and said sample and selectively transmitting only the light of the second wavelength;
    another light detecting element for detecting light of the third wavelength; and
    another optical filter arranged between said another light detecting element and the sample and selectively transmitting only the light of the third wavelength.

42. The scanning probe microscope according to claim 41, wherein said detecting unit includes a camera capable of observing said sample and said probe, and an image display apparatus for displaying an image based on the output signal from said camera or based on the light components of the second and third wavelengths supplied from each of said light detecting elements.

43. The scanning probe microscope according to claim 41, wherein the positional relationship between said probe and said sample is determined on the basis of the changes in the amounts of light components having the second and third wavelengths, said changes being derived from the energy transfer phenomenon of light.

44. A scanning probe microscope using fluorescent light, comprising:
    a probe acting as a provisional light source for supplying a light component to a sample;
    a light source unit for supplying light to said probe to permit the probe to act as a provisional light source for supplying light to said sample;
    an actuator for moving the probe and the sample relative to each other; and
    a detecting unit mounted at a position suitable for optically detecting the positional relationship between the probe and the sample,
    wherein a fluorescent material is imparted to the sample by means of gene manipulation, said fluorescent material is excited by a light component emitted from the probe so as to emit light, and the light thus emitted is detected by said detecting unit.

45. A scanning probe microscope using fluorescent light, comprising:
    a lever section including a probe;
    an actuator for moving said probe and a sample relative to each other;
    a light source means arranged at a position suitable for permitting at least one of the probe and the sample to be irradiated with light having a first wavelength or a second wavelength, which is emitted from said light source means; and
    a detecting means arranged at a position suitable for optically detecting the positional relationship between the probe and the sample,
    wherein:
    a first fluorescent material, which emits light having the second wavelength when excited with light of said first wavelength, is imparted to one of the probe and the sample;
    a second fluorescent material, which emits light having a third wavelength when excited with light having said second wavelength, is imparted to the other of the probe and the sample; and
    said detecting means optically detects the positional relationship between the probe and the sample based on the light having said third wavelength.

* * * * *